United States Patent [19]

Nakamura

[11] Patent Number: 5,663,505

[45] Date of Patent: Sep. 2, 1997

[54] PRESSURE SENSOR HAVING A PIEZOELECTRIC VIBRATOR WITH CONCENCENTRIC CIRCULAR ELECTRODES

[75] Inventor: Takeshi Nakamura, Nagaokakyo, Japan

[73] Assignee: Murata Manufacturing Co., Ltd., Japan

[21] Appl. No.: 647,014

[22] Filed: May 8, 1996

Related U.S. Application Data

[63] Continuation of Ser. No. 292,836, Aug. 19, 1994, abandoned.

[30] Foreign Application Priority Data

Aug. 23, 1993 [JP] Japan ................... 5-230921

[51] Int. Cl.$^6$ ................... G01L 9/08; G01L 7/08
[52] U.S. Cl. ................... 73/702; 73/717; 73/723; 310/321; 310/366
[58] Field of Search ................... 73/702, 717, 723; 310/321, 366, 324

[56] References Cited

U.S. PATENT DOCUMENTS

| | | | |
|---|---|---|---|
| 2,943,278 | 6/1960 | Mattiat | 310/366 X |
| 2,969,512 | 1/1961 | Jaffe et al. | 310/366 X |
| 4,392,074 | 7/1983 | Kleinschmidt et al. | 310/366 X |
| 4,445,384 | 5/1984 | Royer | 310/366 X |
| 4,529,904 | 7/1985 | Hattersley | 310/366 X |
| 4,644,804 | 2/1987 | Ramm et al. | 73/702 X |

*Primary Examiner*—Richard Chilcot
*Assistant Examiner*—Joseph L. Felber
*Attorney, Agent, or Firm*—Ostrolenk, Faber, Gerb & Soffen, LLP

[57] ABSTRACT

A pressure sensor includes a vibrator having a diaphragm valve for detecting pressure. First and second circular piezoelectric bodies are located on a respective one of the two principal planes of the diaphragm valve. On one principal plane of the first piezoelectric body, a first circular electrode is located and a second hollow circular electrode is located so as to surround the first electrode. On one principal plane of the second piezoelectric body, a third circular electrode is located so as to oppose the first electrode and a fourth hollow circular electrode is located so as to surround the third electrode and to oppose to the second electrode. In the diaphragm valve, an inside circular portion of the vibrator interposed between the first electrode and the third electrode and an outside circular portion of the vibrator interposed between the second electrode and the fourth electrode vibrate radially so as to expand and contract in opposite directions.

11 Claims, 2 Drawing Sheets

1

PRESSURE SENSOR HAVING A PIEZOELECTRIC VIBRATOR WITH CONCENCENTRIC CIRCULAR ELECTRODES

This is a Continuation of application Ser. No. 08/292,836, filed on Aug. 19, 1994, now abandoned.

BACKGROUND OF THE INVENTION

1. Field of the Invention

This invention relates to a pressure sensor and, more particularly, to a pressure sensor that uses a piezoelectric-type vibrator as a pressure detection means.

2. Description of the Prior Art

A conventional piezoelectric-type pressure sensor for measuring pressure by utilizing the piezoelectric effect uses a diaphragm valve. In such a pressure sensor, the diaphragm valve is made to have a piezoelectric characteristic and a displacement of the diaphragm valve due to pressure is detected.

However, in such a conventional pressure sensor, relatively high pressure could be detected but relatively low pressure could not be detected.

SUMMARY OF THE INVENTION

Therefore, an object of at least one of the preferred embodiments of the present invention is to provide a pressure sensor that can detect not only relatively high pressure but also relatively low pressure.

At least one of the preferred embodiments of the present invention includes a pressure sensor using a vibrator as a pressure detection means, wherein the vibrator comprises: a vibrating body; a first circular piezoelectric body located on one principal plane of the vibrating body; a second circular piezoelectric body located on the other principal plane of the vibrating body; a first circular electrode located on one principal plane of the first piezoelectric body and a second hollow circular electrode located on the outside thereof; a third circular electrode located on one principal plane of the second piezoelectric body and a fourth hollow circular electrode located on the outside thereof. An inside circular portion interposed between the first electrode and the third electrode and an outside circular portion interposed between the second electrode and the fourth electrode vibrate radially in such a manner that they expand and contract in opposite directions.

In the piezoelectric bodies, the inside circular portion interposed between the first electrode and the third electrode, and the outside circular portion interposed between the second electrode and the fourth electrode vibrate radially in such a manner that they expand and contract in opposite directions, thus even when the piezoelectric bodies resonate, the diameters of the piezoelectric bodies do not vary and the vibration does not leak and is not transmitted to adjacent elements because the edge of the vibrator is not displaced. The vibrator is used as a pressure detection means of the pressure sensor, thereby a variation of resonance characteristics can be detected besides the variation of pressure due to the displacement.

A pressure sensor according to at least one of the preferred embodiments of the present invention can detect the resonance characteristic variation besides the pressure variation due to the displacement, thus a detection sensitivity to the pressure variation can be enhanced and relatively low pressure can be detected, in addition to relatively high pressure.

2

In a vibrator that is used as a pressure detection means of this pressure sensor, the diameters of the piezoelectric bodies do not vary and the vibration does not leak even when the vibrator resonates, thus the resonance characteristic and the pressure sensor characteristic can be stabilized. The detection sensitivity to the pressure variation can be enhanced, thereby a pressure sensor having a miniature size and a low cost can be obtained.

The above and further objects, features, aspects and advantages of the preferred embodiments of the present invention will more fully be apparent from the following detailed description of the preferred embodiments, with reference to the accompanying drawings.

DESCRIPTION OF THE PREFERRED EMBODIMENTS

Figure 1:
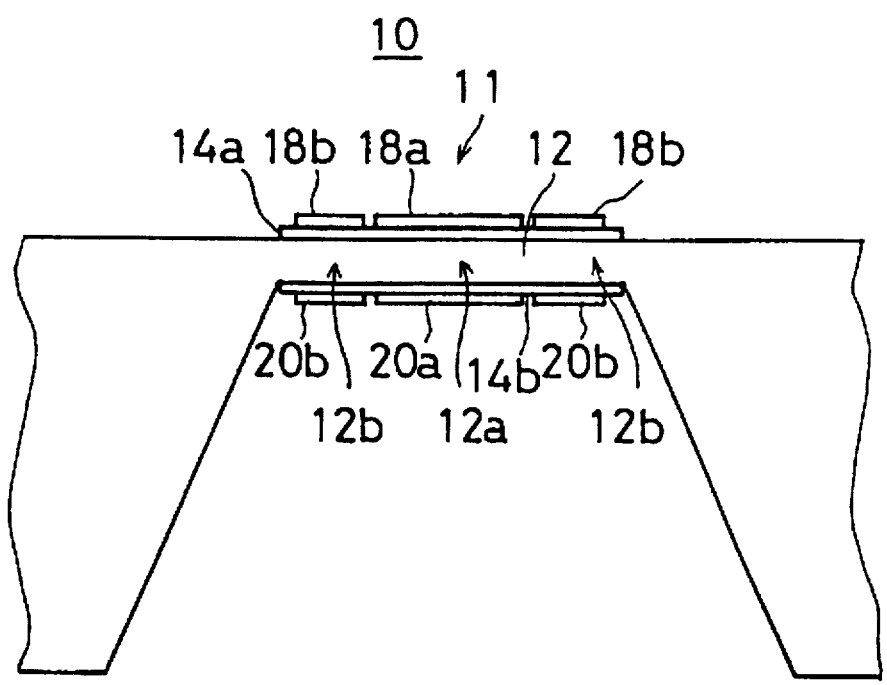
FIG. 1 is a front view showing one preferred embodiment of the present invention.
Figure 2:
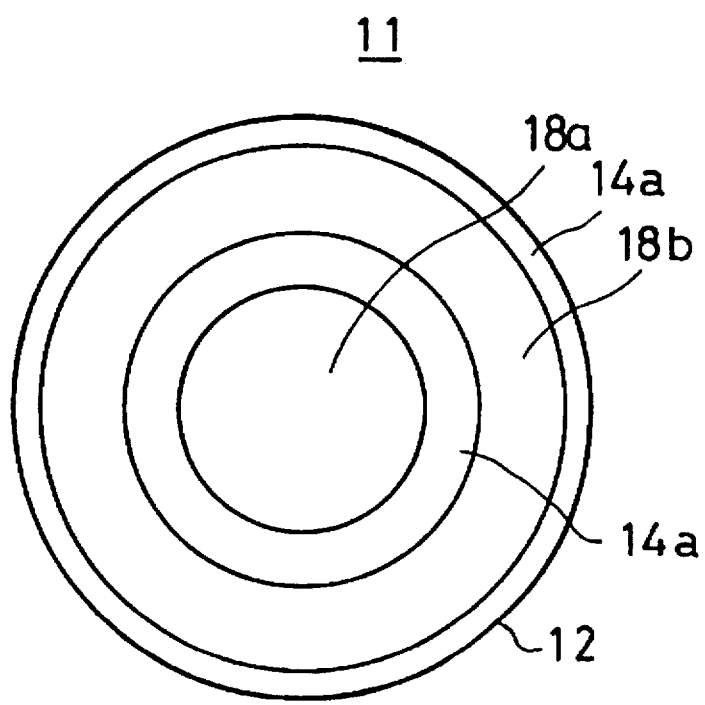
FIG. 2 is a plan view showing a vibrator of a pressure senor in the preferred embodiment of FIG. 1.

FIG. 1 is a front view showing one preferred embodiment of the invention. A pressure sensor 10 includes a vibrator 11 shown in FIG. 2. The vibrator 11 has a diaphragm valve 12 for functioning as a vibration body. The diaphragm valve 12 is made of non-piezoelectric material such as metal or ceramics and formed by a process preferably including the steps of cutting, pressing and etching. On principal planes of the diaphragm valve 12, piezoelectric bodies 14a and 14b are respectively formed.

The piezoelectric bodies 14a and 14b have piezoelectric properties and are formed of piezoelectric ceramics or ZnO or others. On one principal plane of the piezoelectric body 14a, a first circular electrode 18a is formed, a second hollow circular electrode 18b is formed outside the first electrode 18a. On one principal plane of the piezoelectric body 14b, a third circular electrode 20a is formed, a fourth hollow circular electrode 20b is formed outside the third electrode 20a. In addition, the diaphragm valve 12 includes an inside circular portion 12a interposed between the first electrode 18a and the third electrode 20a and an outside circular portion 12b interposed between the second electrode 18b and the fourth electrode 20b. The first electrode 18a, the second electrode 18b, the third electrode 20a and the fourth electrode 20b are arranged so that the outer diameter of the inside circular portion 12a and the inner diameter of the outside circular portion 12b are almost equal to a half of the radius of the diaphragm valve 12.

Figure 3:
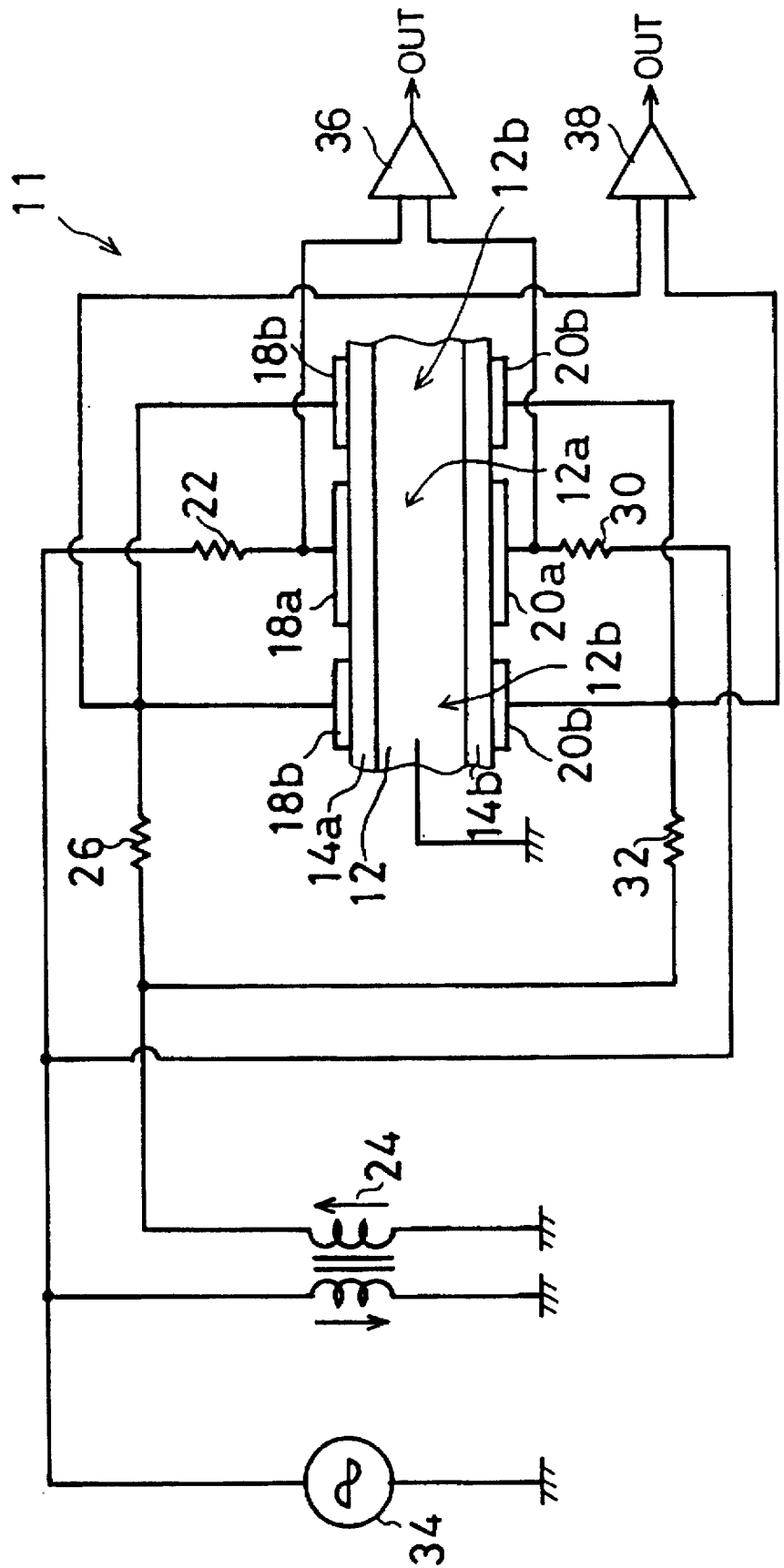
FIG. 3 is a circuit diagram showing connection of a transformer and resistors to electrodes.

As shown in FIG. 3, the first electrode 18a is grounded via a resistor 22 and a primary coil of a transformer 24. The second electrode 18b is grounded via a resistor 26 and a secondary coil of the transformer 24, the third electrode 20a is grounded via a resistor 30 and the primary coil of the transformer 24. The fourth electrode 20b is grounded via a resistor 32 and the secondary coil of the transformer 24. The first electrode 18a and the third electrode 20a are grounded via an A.C. power supply 34. The first electrode 18a and the third electrode 20a are respectively connected to two input terminals of a differential circuit 36, and the second electrode 18b and the fourth electrode 20b are respectively connected to two input terminals of a differential circuit 38.

The electrodes 18a, 18b, 20a and 20b are disposed and characteristics of the piezoelectric bodies 14a and 14b and a polarity of a voltage (drive signal) applied to the piezoelectric bodies are determined so that the inside circular portion 12a of the diaphragm valve 12 and the outside circular portion 12b of the diaphragm valve 12 will vibrate longitudinally in such a manner that they expand and contract in opposite directions.

According to this preferred embodiment, the diaphragm valve 12 has a resonance characteristic determined by a shape of the diaphragm valve 12, such as a radius of the valve 12. The valve 12 is adapted to radially vibrate in such a manner that the inside circular portion 12a and the outside circular portion 12b expand and contract in opposite directions by setting a frequency of the drive signal to be substantially equal to the resonance frequency. Setting a frequency of the drive signal to be substantially equal to the resonance frequency may be performed by self-excited vibration.

When pressure is applied to the diaphragm valve 12, the diaphragm valve 12 bends. A difference of output voltages of the first electrode 18a and the third electrode 20a is measured by the differential circuit 36, and a difference of output voltages of the second electrode 18b and the fourth electrode 20b is measured by the differential circuit 38, thereby a variation of pressure and a variation of the resonance characteristic due to the bend of the diaphragm valve 12 can be detected. According to this preferred embodiment, the variation of the resonance characteristic can be detected in addition to detecting the variation of the pressure due to the displacement which was conventionally achieved. Therefore, a detection sensitivity to a pressure variation can be enhanced in accordance with Q factor of the diaphragm valve 12, thus relatively low pressure can be detected in addition to relatively high pressure. In the vibrator 11, the inside circular portion 12a and the outside circular portion 12b vibrate longitudinally in such a manner that they expand and contract in opposite directions, thus even when the diaphragm valve 12 resonates (vibrates), a diameter of the diaphragm valve 12 does not vary, and the vibration does not leak, therefore the resonance characteristic of the vibrator 11 is stabilized. Thus, the characteristics of the pressure sensor can be stabilized. Thereby, the detection sensitivity to a pressure variation can be enhanced and the diaphragm, valve 12 can be miniaturized and the pressure sensor 10 having a miniature size and of a low cost can be obtained.

In the above preferred embodiment, the diaphragm valve 12 is preferably made of non-piezoelectric material, and the piezoelectric bodies having piezoelectric properties are formed on both the principal planes of the diaphragm valve 12. However, the diaphragm valve 12 itself may be made of material having the piezoelectric property.

It will be apparent from the foregoing that, while the present invention has been described in detail and illustrated, these are only particular illustrations and examples, and the invention is not limited to these. The spirit and scope of the invention is limited only by the appended claims.

What is claimed is:

1. A pressure sensor comprising a vibrator for detecting pressure, wherein said vibrator comprises:

a vibrating body having first and second principal planes;

a first circular piezoelectric body located on said first principal plane of said vibrating body;

a second circular piezoelectric body located on said second principal plane of said vibrating body;

a first circular electrode located on said first piezoelectric body and a second hollow circular electrode located on said first piezoelectric body so as to surround said first circular electrode;

a third circular electrode located on said second piezoelectric body and a fourth hollow circular electrode located on said second piezoelectric body so as to surround said third circular electrode;

a signal generator electrically connected to at least one of said first circular electrode and said third circular electrode for applying an input voltage signal to said at least one of said first circular electrode and said third circular electrode; and a transformer electrically connected to said signal generator and to at least one of said first circular electrode and said third circular electrode for receiving from said signal generator an input voltage signal comprising a first input voltage signal having a first polarity and applying a second input voltage signal to said at least one of said second hollow electrode and said fourth hollow electrode, said second input voltage signal having a second polarity opposite to said first polarity.

2. A pressure sensor comprising a vibrator for detecting pressure, wherein said vibrator comprises:

a vibrating body having first and second principal planes;

a first circular piezoelectric body located on said first principal plane of said vibrating body;

a second circular piezoelectric body located on said second principal plane of said vibrating body;

a first circular electrode located on said first piezoelectric body and a second hollow circular electrode located on said first piezoelectric body so as to surround said first circular electrode;

a third circular electrode located on said second piezoelectric body and a fourth hollow circular electrode located on said second piezoelectric body so as to surround said third circular electrode;

a signal generator electrically connected to at least one of said first circular electrode and said third circular electrode for applying an input voltage signal to said at least one of said first circular electrode and said third circular electrode; and a differential circuit electrically connected to at least one of said first circular electrode and said third circular electrode for receiving an output voltage signal from said at least one of said first circular electrode and said third circular electrode.

3. A pressure sensor comprising a vibrator for detecting pressure, wherein said vibrator comprises:

a vibrating body having first and second principal planes;

a first circular piezoelectric body located on said first principal plane of said vibrating body;

a second circular piezoelectric body located on said second principal plane of said vibrating body;

a first circular electrode located on said first piezoelectric body and a second hollow circular electrode located on said first piezoelectric body so as to surround said first circular electrode;

a third circular electrode located on said second piezoelectric body and a fourth hollow circular electrode located on said second piezoelectric body so as to surround said third circular electrode;

a signal generator electrically connected to at least one of said first circular electrode and said third circular electrode for applying an input voltage signal to said at least one of said first circular electrode and said third circular electrode; and a differential circuit electrically connected to at least one of said second hollow electrode and said fourth hollow electrode for receiving an output voltage signal from said at least one of said second hollow electrode and said fourth hollow electrode.

4. A pressure sensor comprising a vibrator for detecting pressure, wherein said vibrator comprises:

a vibrating body having first and second principal planes;

a first circular piezoelectric body located on said first principal plane of said vibrating body;

a second circular piezoelectric body located on said second principal plane of said vibrating body;

a first circular electrode located on said first piezoelectric body and a second hollow circular electrode located on said first piezoelectric body so as to surround said first circular electrode;

a third circular electrode located on said second piezoelectric body and a fourth hollow circular electrode located on said second piezoelectric body so as to surround said third circular electrode; wherein an inside circular portion of said vibrating body interposed between said first electrode and said third electrode and an outside circular portion of said vibrating body interposed between said second electrode and said fourth electrode is arranged and adapted to vibrate radially so as to expand and contract simultaneously in opposite directions such that when one of said inside circular portion and said outside circular portion expands, the other of said inside circular portion and said outside circular portion simultaneously contracts.

5. The pressure sensor of claim 4, wherein said vibrating body comprises a diaphragm valve.

6. A pressure sensor comprising a vibrator for detecting pressure, wherein said vibrator comprises:

a vibrating body having first and second principal planes;

a first circular piezoelectric body located on said first principal plane of said vibrating body;

a second circular piezoelectric body located on said second principal plane of said vibrating body;

a first circular electrode located on said first piezoelectric body and a second hollow circular electrode located on said first piezoelectric body so as to surround said first circular electrode;

a third circular electrode located on said second piezoelectric body and a fourth hollow circular electrode located on said second piezoelectric body so as to surround said third circular electrode; and a detector for detecting a variation of a resonance characteristic of said vibrating body.

7. The pressure sensor of claim 6, wherein said detector is adapted and arranged to detect a variation in pressure applied to said vibrating body.

8. The pressure sensor of claim 6, wherein said detector comprises at least one differential circuit electrically connected to at least one of said first, second, third and fourth electrodes.

9. The pressure sensor of claim 6, further comprising a signal generator electrically connected to at least one of said first circular electrode and said third circular electrode for applying an input voltage signal to said at least one of said first circular electrode and said third circular electrode.

10. The pressure sensor of claim 6, wherein said first circular electrode, said second hollow electrode, said third circular electrode and said fourth hollow electrode are adapted and arranged to vibrate such that an inside circular portion of said vibrating body interposed between said first electrode and said third electrode and an outside circular portion of said vibrating body interposed between said second electrode and said fourth electrode is arranged and adapted to vibrate radially so as to expand and contract simultaneously in opposite directions such that when one of said inside circular portion and said outside circular portion expands, the other of said inside circular portion and said outside circular portion contracts.

11. The pressure sensor of claim 6, wherein said vibrating body comprises a diaphragm valve.

* * * * *